United States Patent [19]

Rowland-Hill et al.

[11] 3,872,982

[45] Mar. 25, 1975

[54] GRAIN UNLOADING ASSEMBLY

[75] Inventors: Edward W. Rowland-Hill, Lancaster; Claude K. Focht, New Holland, both of Pa.

[73] Assignee: Sperry Rand Corporation, New Holland, Pa.

[22] Filed: June 5, 1974

[21] Appl. No.: 476,504

[52] U.S. Cl. ............... 214/17 D, 198/100, 198/213, 214/83.32, 214/520
[51] Int. Cl. ............................................ B65g 65/46
[58] Field of Search ............ 214/17 D, 83.26, 83.32, 214/520, 521, 522; 198/99, 100, 113, 114, 115, 213

[56] References Cited
UNITED STATES PATENTS
3,638,812  2/1972  Ryczek ........................... 214/83.26
3,664,525  5/1972  Herbsthofer ................. 214/83.32 X

*Primary Examiner*—Robert G. Sheridan
*Attorney, Agent, or Firm*—Frank A. Seemar; John R. Flanagan; Joseph A. Brown

[57] ABSTRACT

A grain handling apparatus for a combine harvester includes a grain storage tank, an auger rotatably mounted along the tank bottom for delivering grain in the tank to a discharge opening in the tank bottom and an assembly for unloading grain from the tank including a tube having a grain receiving end and an auger rotatably mounted in the tube. An outwardly and downwardly projecting neck fixed about the tank discharge opening mounts the tube receiving end generally below and in communication with the discharge opening of the tank to thereby allow grain upon being delivered to the tank discharge end to flow with the aid of gravity from the tank into the tube. The neck also rotatably mounts the tube receiving end about an axis which extends transversely past and offset from the rotational axis of the tube auger and intersects with the rotational axis of the tank auger for pivoting the tube between storage and unloading positions relative to the tank. The tube auger has a rotatable central shaft and helical flighting attached about the shaft for receiving grain at an end of the tube auger and conveying the grain within the tube away from the tank. The auger flighting is interrupted for a short distance along the auger shaft at the receiving end of the auger to define a passageway through the flighting adjacent the auger shaft. The unloading assembly also includes a drive transmission which couples the discharge end of the tank auger with the receiving end of the tube auger and has drive shaft means extending generally downwardly from adjacent the discharge end of the rotatable tank auger and transversely across the tube through the flighting passageway and past the auger shaft in an offset relationship thereto so as to assume a position in general alignment with the path of gravity-aided grain flow from the tank discharge end into the tube receiving end. The drive shaft means is rotatably about an axis coincident with the rotational axis of the tube.

8 Claims, 3 Drawing Figures

3,872,982

PATENTED MAR 25 1975 3,872,982

GRAIN UNLOADING ASSEMBLY

BACKGROUND OF THE INVENTION

1. Field of the Invention

The present invention relates generally to grain handling apparatus having a grain storage tank and, more particularly, is concerned with an assembly for unloading grain from the storage tank of the apparatus.

2. Description of the Prior Art

Grain handling apparatus, such as combine harvesters, commonly have a tank for temporarily storing grain during performance of harvesting operations in the field by the harvesters and an assembly for unloading the grain from the storage tank either as the harvesting operation is in progress or during its periodic interruption. An auger is normally mounted inside the tank, such as along the bottom of the tank, and rotatably driven for delivering grain in the tank to a discharge opening located in the tank bottom. The unloading assembly commonly includes a tube and an auger rotatably mounted inside the tube with the tube having a receiving end mounted in communication with the discharge opening of the tank. Whenever the tank auger is rotatably driven to deliver grain in the tank to the tank discharge opening and into the receiving end of the tube of the unloading assembly, the tube auger is simultaneously rotatably driven for conveying the grain within the tube away from the tank toward a discharge end of the tube to thereby unload the grain from the tank.

Generally, the tube auger is most conveniently driven by providing some type of drive transmission arrangement connecting the discharge end of the tank auger and the receiving end of the tube auger so that the tank auger, when it is rotatably driven, will, in turn, rotatably drive the tube auger.

British Pat. No. 1,086,037 and U.S. Pat. No. 3,664,525 disclose drive transmission arrangements of this general type. However, the arrangement disclosed by the aforementioned British Patent disadvantageously allows some of the grain delivered with the aid of gravity from the discharge end of the tank auger to the receiving end of the unloading tube to collect in a "dead" space defined therein by a flightless end section of the tube auger and thereby interrupt or impede the smooth flow of grain from the tank to the unloading tube. Furthermore, while the drive transmission arrangement disclosed by the aforementioned U.S. Pat. eliminates the possibility of dead material buildup at the receiving end of the unloading tube, it disadvantageously provides a gearbox, being coupled to the discharge end of the tank auger, located partially within the natural path of gravity-aided grain flow from the tank auger to the tube auger and a rotatable drive shaft extending from the gearbox transversely across the path of grain flow and parallel to the rotational axis of the tube auger which both tend to interrupt or impede the smooth flow of grain from the tank to the unloading tube. Such interruption of the smooth flow of grain reduces the unloading rates which may be attained by the unloading assemblies disclosed by the aforementioned patents and also increases churning of grain within the assemblies and, thus, the likelihood of damage to the grain.

SUMMARY OF THE INVENTION

The grain unloading assembly of the present invention avoids the aforementioned disadvantages by providing drive transmission means which is generally positioned in alignment with the natural path of gravity-aided grain flow from the discharge end of tank grain delivering means, such as the tank auger, to the receiving end of tube grain conveying means, such as the tube auger. A drive transmission arrangement having such an alignment minimizes obstruction to the free movement of grain and thereby substantially allows uninterrupted gravity-aided grain flow from the tank to the unloading tube. Such non-interruption of the smooth flow of grain enhances the unloading rates which may be attained by the unloading assembly of the present invention.

Accordingly, the present invention broadly relates to an improved unloading assembly in a grain handling apparatus. The grain handling apparatus is of the type which includes a grain storage tank having a grain discharge end and means rotatably mounted inside the tank for delivering grain in the tank to the discharge end thereof with the tank delivering means having an end located at the tank discharge end.

The improved unloading assembly broadly comprises a tube located outside the tank and having an end for receiving grain delivered to the discharge end of the tank, means mounting the tube at its receiving end generally below and in communication with the discharge end of the tank to thereby allow grain upon being delivered to the tank discharge end to flow with the aid of gravity from the tank into the tube, means rotatably mounted in the tube for receiving at an end thereof the delivered grain which flows into the tube receiving end from the tank discharge end and for conveying the grain within the tube away from the tank to thereby unload the grain from the tank, and drive transmission means coupling the discharge end of the rotatable tank delivering means with the grain receiving end of the tube conveying means. The drive transmission means includes drive shaft means which extends generally downwardly from adjacent the discharge end of the rotatable tank delivering means at the tank discharge end and transversely across the tube past and offset from the rotational axis of the tube conveying means so as to assume a position in general alignment with the path of gravity-aided grain flow from the tank discharge end into the tube receiving end, the drive shaft means further being rotatable about an axis which intersects with the rotational axis of the rotatable tank delivering means.

More particularly, the tube conveying means comprises an auger having a central shaft rotatably mounted in the tube and helical flighting attached about the auger shaft for receiving the delivered grain, which flows into the tube receiving end from the tank discharge end, at an end of the auger. The auger flighting is interrupted for a short distance along the auger shaft at the auger receiving end to define a passageway through the auger flighting adjacent the auger shaft. The drive shaft means of the drive transmission means extends through the flighting passageway.

Further, more particularly, the mounting means rotatably mounts the tube at its receiving end to the discharge end of the tank about an axis coincident with the rotational axis of the drive shaft means of the drive transmission means for allowing pivoting of the tube between a storage position and an unloading position within interfering with the drive coupling of the drive transmission means with the drain receiving end of the auger and the discharge end of the rotatable tank delivering means.

Still further, the drive transmission means also includes first means drivingly coupling the discharge end of the rotatable tank delivering means to one end of the drive shaft means and being generally positioned in alignment with the path of gravity-aided grain flow from the tank discharge end. Second means is further included for drivingly coupling the auger shaft at the grain receiving end of the auger to an opposite end of the drive shaft means. The second coupling means is preferably located outside of the tube.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following detailed description, it is to be understood that such terms as "forward," "rearward," "left," "upwardly," etc., are words of convenience and not to be construed as limiting terms.

In General

Figure 1:
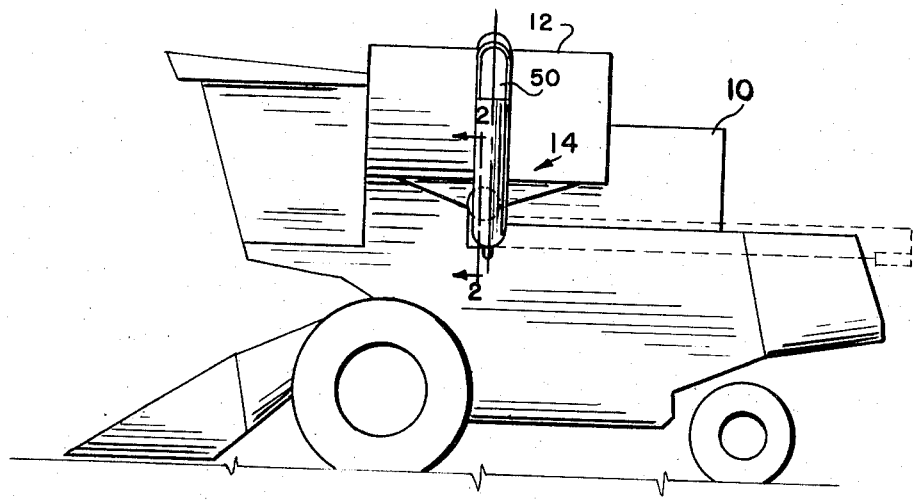
FIG. 1 is a schematical side view of a combine harvester provided with the improved unloading assembly of the present invention, showing the unloading tube in a grain unloading position.

Referring now to FIG. 1 there is shown a self-propelled combine harvester, indicated generally by numeral 10, having a grain storage tank 12 and an improved unloading assembly, generally designated by numeral 14, associated with the tank 12. As partially shown in FIGS. 2 and 3, means preferably in the form of an auger 16 is rotatably mounted inside the tank 12 along its bottom for delivering grain in the tank 12 to a discharge end thereof, such as defined by an opening 18 formed in the tank bottom.

While the unloading assembly 14 of the present invention is illustrated and described in association with a grain storage tank on a self-propelled combine harvester, it should be understood that this invention is also suitable for use with the tank on a pull-type combine harvester and on various other forms of grain handling apparatus.

Grain Unloading Assembly

The unloading assembly broadly includes an unloading tube 20, mounting means, generally designated 22, for mounting the tube 20 to the tank 12, means preferably in the form of an auger 24 rotatably mounted in the tube 20 and drive transmission means, generally indicated at 26, for drivingly coupling the tank auger 16 to the tank auger 24.

The unloading tube 20 is located outside the tank 12 and has a receiving end, generally designated 28, which is mounted generally below the discharge end of the tank 12 by mounting means such as a hollow neck 30 being fixedly mounted at one end about opening 18 formed in the tank bottom. An opening 32 is formed in the upper side of the tube receiving end 28 and is encompassed by an annular flange 34. The flange 34 has an annular, inwardly-projecting ring 36 attached thereto to define an annular inwardly-opening groove 38 within which an outwardly-projecting annular flange 40 on the other end of the neck 30 is received. The ring 36 is slideable relative to the neck flange 40 whereby the receiving end 28 of the tube 20 may be rotated about the neck 30 about an axis A.

Figure 3:
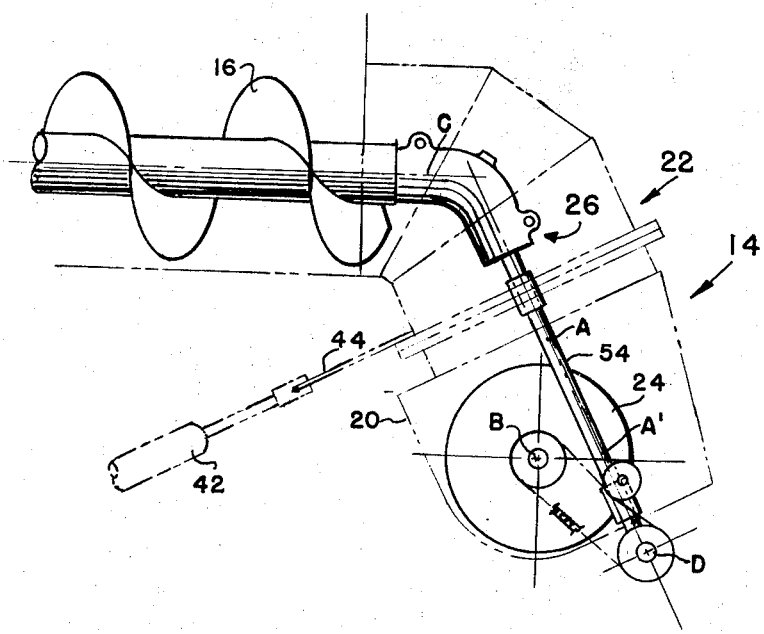
FIG. 3 is an enlarged front end view of the unloading assembly of FIG. 1 with the unloading tube being disposed in a storage position being indicated in in broken line form in FIG. 1.
Figure 2:
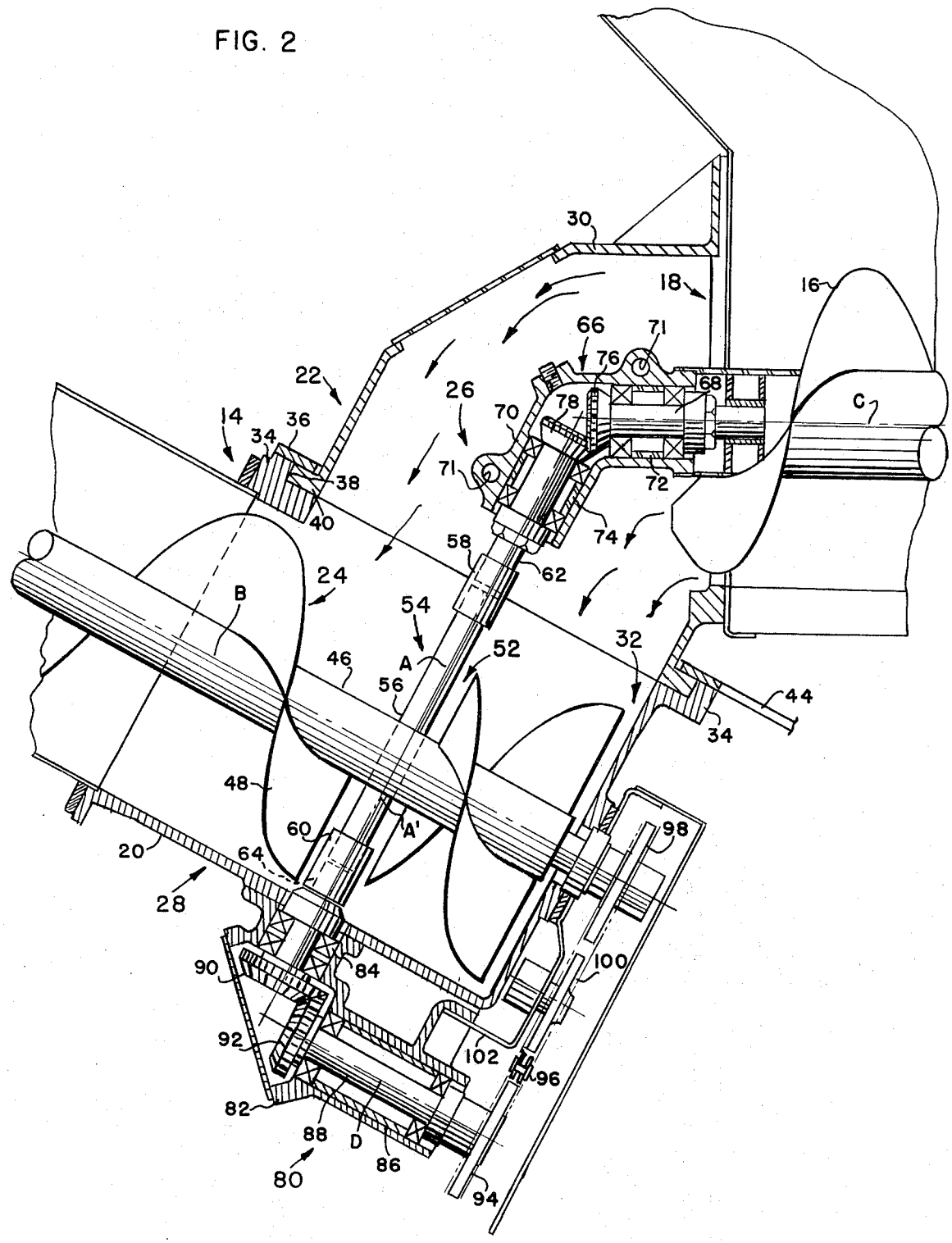
FIG. 2 is an enlarged partial cross-sectional view taken generally on line 2—2 of FIG. 1.

As seen in FIG. 3, a hydraulic cylinder 42 is pivotally anchored at its one end (not shown) to the combine harvester frame and at its other end is pivotally secured to a tab 44 fixed to and projecting outwardly from the annular ring 36 on the tube flange 34. Selected extension and retraction of the hydraulic cylinder 42 by suitable hydraulic controls (not shown) pivots the tube 20 about the rotational axis A of its receiving end 28 between an unloading position, as shown in FIG. 2 and in solid line in FIG. 1, wherein the tube 20 is disposed inclined outwardly and upwardly from the tank 12 and a storage position, as shown in FIG. 3 and in broken line in FIG. 1, wherein the tube 20 generally extends rearwardly and horizontally along the tank unloading side of the harvester 10.

The neck 30 thus provides communication between the tube receiving end opening 32 and the discharge end opening 18 of the tank 12 to thereby allow grain upon being delivered by the tank auger 16 to the tank discharge end opening 18 to flow with the aid of gravity from the tank 12 into the tube 20 in a generally downwardly direction. Further, because of the closed rotatable mounting arrangement of the tube 20 to the tank 12 by the neck 30, grain cannot discharge from the tank 12 to the ground during pivoting of the tube 20 between its storage and unloading positions.

The tube auger 24 of the unloading assembly 14 has a central shaft 46 rotatably mounted in the tube 20 about an axis B and helical flighting 48 attached about the auger shaft 46. The flighting 48 receives the delivered grain, which flows into the tube 20 through its receiving end opening 32 from the tank discharge end opening 18, at a receiving end of the tube auger 24 being encompassed by the receiving end 28 of the tube 20. The flighting 48 then, upon rotation of tube auger 24, conveys the grain within the tube 20 away from the tank 12 toward an outer discharge end 50 (shown in FIG. 1) of the tube 20 to thereby unload the grain from the tank 12.

The auger flighting 48 is interrupted for a short distance along the auger shaft 46 at the auger receiving end to define a narrow passageway, generally designated as numeral 52, through the flighting 48 and adjacent the auger shaft 46. The passageway 52 is just wide enough to provide adequate clearance for passage therethrough of a component of the drive transmission means 26, as will be explained hereinafter. However, the presence of the passageway 52 does not significantly affect the ability of the auger flighting 48 to smoothly convey grain within the tube 20 at high unloading rates away from the receiving end of the auger 24 as grain is received there from the tank 12 through tube opening 32.

The drive transmission means 26 of the unloading assembly 14 drivingly couples the discharge end of the tank auger 16 to the receiving end of the tube auger 24. Therefore, whenever the tank auger 16 is rotatably driven, such as at its opposite end (not shown) from its discharge end by any suitable means generally known in the art, to deliver grain in the tank 12 to the tank discharge opening 18 from there by gravity-aided flow through the neck 30 and tube receiving end opening 32 into the tube receiving end 28, the tube auger 24 is simultaneously rotatably driven by the tank auger 16 via the drive transmission means 26 for conveying the grain within the tube 20 away from the tank 12.

The drive transmission means 26 includes a drive shaft means, generally designated 54, which extends generally downwardly from adjacent the discharge end of the tank auger 16 and transversely across the unloading tube 20 at its receiving end 28 through the auger flighting passageway 52 (as seen in FIG. 2), adjacent the auger shaft (as seen in FIG. 3), to a side of the tube receiving end 28 opposite from the opening 32. It is apparent that the position assumed by the drive shaft means 54 is generally aligned with the path of gravity-aided grain flow, as illustrated by the plurality of arrows in FIG. 2, from the tank discharge end opening 18 into the tube receiving end 28. As stated hereinbefore, such alignment minimizes obstruction by the drive shaft means 54 to the free downward movement of the grain.

The drive shaft means 54 includes an elongated intermediate drive shaft 56 being removably spline-fitted at its opposite ends into couplers 58,60 and end shafts 62,64 also being respectively removably spline-fitted into the couplers 58,60. The intermediate and end shafts 56,62,64 will rotate together as if they were a single unitary shaft while at the same time their coupled relationship to each other compensates for any slight axial misalignment between them.

The drive transmission means 26 also includes first means, generally designated 66, for drivingly coupling the one end shaft 62 at one end of the drive shaft means 54 to a shaft 68 at the discharge end of the tank auger 16. The first coupling means 66 includes an elbow casing 70 being mounted at a central position in the neck 30 in general alignment with the path of gravity-aided grain flow from the tank discharge end opening 18 through the neck 30 by a pair of spaced rods (not shown) extending between opposite sides of the neck 30 and respectively through a pair of spaced bores 71 formed on one side of the casing 70. The first coupling means 66 further includes bearings 72,74 secured by suitable fastening means (not shown) in the casing 70 which receive and rotatably mount the end of the tank auger shaft 68 and an end of the one end shaft 62 of the drive shaft means 54 and a pair of meshing gears 76,78 fixed respectively to the adjacent ends of tank auger shaft 68 and the one end shaft 62.

The drive transmission means 26 further includes second means, generally designated 80, for drivingly coupling the opposite end shaft 64 at the opposite end of the drive shaft means 54 to the receiving end of the tube auger 24. The second coupling means 80 is preferably located outside of the tube 20.

The second coupling means 80 includes a casing 82 being removably fixed by suitable fastening means (not shown) to the side of the tube 20 opposite the tube receiving opening 32 and a bearing 84 being retained by suitable fastening means (not shown) within the casing 82 for receiving and rotatably mounting the opposite end shaft 64 of the drive shaft means 54 which extends through an opening in the tube side. The second coupling means 80 also includes another bearing 86 being retained by suitable fastening means (not shown) within the casing 82 and a short drive shaft 88 received through and rotatably mounted by the bearing 86. A pair of meshing gears 90,92 are respectively secured to the adjacent ends of the opposite end shaft 64 and the short drive shaft 88. The short drive shaft 88 has a sprocket 94 fixedly mounted on its opposite end which is drivingly connected by a drive chain 96 to an external sprocket 98 fixedly mounted to the end of the tube auger shaft 46 which extends exteriorly of the tube receiving end 28. An idler sprocket 100 is rotatably mounted on a bracket 102 being fixed to the tube receiving end 28 and may be adjusted against the drive chain 96 for applying appropriate tension to the chain 96.

It will be observed that the drive shaft means 54, which includes the shafts 56,62,64, is mounted by bearings 74,84 of the first and second coupling means 66,80 for rotation about an axis A' generally coincident with the rotational axis A of the tube receiving end 28 about the neck 30. Further, the rotational axis A' of the drive shaft means 54 intersects with the rotational axis C of the tank auger 16 and is aligned generally perpendicular to and offset from one side of the rotational axis B of the tube auger 24. Also, it will be observed that the rotational axis D of the short drive shaft 88 intersects with, and is generally perpendicular to, the rotational axis A' of the drive shaft means 54 and is generally parallel to the rotational axis B of the tube auger. Since the first coupling means 66 is stationarily mounted within the neck 30, the second coupling means 80 is mounted about the exterior of the tube receiving end 28, and the end shafts 62,64 of the drive shaft means 54 are respectively rotatably mounted within the bearings 74,84 of the first and second coupling means 66,80, pivotal movement of the tube 20 between its storage and unloading positions does not interfere with the drive coupling arrangement provided by the drive transmission means 26. Therefore, the tube 20 may be pivoted while the tank auger 16 is rotating and thereby causing rotation of the unloading tube auger 24 via the drive transmission means 26.

It is thought that the invention and many of its attendant advantages will be understood from the foregoing description and it will be apparent that various changes may be made in the form construction and arrangement of the unloading assembly described without departing from the spirit and scope of the invention or sacrificing all of its material advantages, the form hereinbefore described being merely a preferred or exemplary embodiment thereof.

Having thus described the invention, what is claimed is:

1. In a grain handling apparatus of the type which includes a grain storage tank having a grain discharge end and means located inside said tank for delivering grain in said tank to said discharge end, said tank delivering means having an end with a rotatable driving element disposed at said discharge end, an improved unloading assembly comprising:

a tube located outside said tank and having an end for receiving grain delivered to said discharge end of said tank;

means mounting said tube at its receiving end generally below and in communication with said discharge end of said tank to thereby allow grain upon being delivered to said discharge end to flow with the aid of gravity from said tank into said tube;

means rotatably mounted in said tube for receiving at an end thereof the delivered grain which flows into said tube receiving end from said tank discharge end and for conveying the grain within said tube away from said tank to thereby unload the grain from said tank; and drive transmission means coupling said driving element of said tank delivering means with said grain receiving end of said tube conveying means and including drive shaft means which extends generally downwardly from adjacent said driving element at said tank discharge end and transversely across said tube past and offset from the rotational axis of said tube conveying means so as to assume a position in general alignment with the path of gravity-aided grain flow from said tank discharge end into said tube receiving end, said drive shaft means further being rotatable about an axis which intersects with the rotational axis of said driving element.

2. The grain handling apparatus as recited in claim 1, wherein:

said tube conveying means includes helical flighting for receiving the delivered grain which flows into said tube receiving end from said tank discharge end, said flighting being interrupted for a short distance along the rotational axis of said tube conveying means at said tube receiving end to define a passageway through said flighting; and said drive shaft means extends through said flighting passageway.

3. The grain handling apparatus as recited in claim 1, wherein said mounting means rotatably mounts said tube at its receiving end to said discharge end of said tank about an axis coincident with said rotational axis of said drive shaft means for allowing pivoting of said tube between a storage position and an unloading position without interfering with the drive coupling of said drive transmission means with said grain receiving end of said tube conveying means and said driving element of said tank delivering means.

4. The grain handling apparatus as recited in claim 1, wherein said tube conveying means is an auger having a central shaft rotatably mounted in said tube and helical flighting attached about said auger shaft for receiving the delivered grain which flows into said tube receiving end from said tank discharge end and for conveying the grain within said tube away from said tank, said auger flighting being interrupted for a short distance along said auger shaft at said tube receiving end to define a passageway through said auger flighting adjacent said auger shaft; and said drive shaft means extends through said auger flighting passageway past said auger shaft adjacent to, but offset from, said auger shaft.

5. The grain handling apparatus as recited in claim 1 wherein said drive transmission means further includes first means drivingly coupling said driving element to one end of said drive shaft means, said first means being generally positioned in alignment with the path of gravity-aided grain flow from said tank discharge end, and second means drivingly coupling said grain receiving end of said tube conveying means to an opposite end of said drive shaft means.

6. The grain handling apparatus as recited in claim 5 wherein said second coupling means is located outside of said tube.

7. In a grain handling apparatus of the type which includes a grain storage tank having a grain discharge end and means rotatably mounted inside said tank for delivering grain in said tank to said discharge end, said tank delivering means having an end located at said discharge end, an improved unloading assembly comprising:

a tube located outside said tank and having an end for receiving grain delivered to said discharge end of said tank;

means mounting said tube at its receiving end generally below and in communication with said discharge end of said tank to thereby allow grain upon being delivered to said discharge end to flow with the aid of gravity from said tank into said tube;

an auger having a central shaft rotatably mounted in said tube and helical flighting attached about said auger shaft for receiving the delivered grain, which flows into said tube receiving end from said tank discharge end, at an end of said auger and for conveying the grain within said tube away from said tank to thereby unload the grain from said tank, said auger flighting being interrupted for a short distance along said auger shaft at said auger receiving end to define a passageway through said auger flighting adjacent said auger shaft; and drive transmission means coupling said discharge end of said rotatable tank delivering means with said auger shaft at said grain receiving end of said auger, said drive transmission means including drive shaft means which extends generally downwardly from adjacent said discharge end of said rotatable tank delivering means and transversely across said tube through said auger flighting passageway adjacent said auger shaft so as to assume a position in general alignment with the path of gravity-aided grain flow from said tank discharge end into said tube receiving end, said drive shaft means further being rotatable about an axis which intersects with the rotational axis of said tank delivering means and extends transversely past and offset from the rotational axis of said auger shaft, first means drivingly coupling said discharge end of said rotatable tank delivering means to one end of said drive shaft means, said first means being generally positioned in alignment with the path of gravity-aided grain flow from said tank discharge end, and second means drivingly coupling said auger shaft at said grain receiving end of said auger to an opposite end of said drive shaft means.

8. The grain handling apparatus as recited in claim 7, wherein said mounting means rotatably mounts said tube at its receiving end to said discharge end of said tank about an axis coincident with said rotational axis of said drive shaft means for allowing pivoting of said tube between a storage position and an unloading position without interfering with the drive coupling of said drive transmission means with said discharge end of said rotatable tank delivering means and said auger shaft at said grain receiving end of said auger.

* * * * *